United States Patent
Smith

(10) Patent No.: US 7,454,850 B2
(45) Date of Patent: Nov. 25, 2008

(54) SKID STEER SCRAPER

(75) Inventor: Stanley K. Smith, Council Bluffs, IA (US)

(73) Assignee: Ashland Industries Management Group, Ashland, WI (US)

( * ) Notice: Subject to any disclaimer, the term of this patent is extended or adjusted under 35 U.S.C. 154(b) by 77 days.

(21) Appl. No.: 11/518,466

(22) Filed: Sep. 8, 2006

(65) Prior Publication Data

US 2008/0060232 A1 Mar. 13, 2008

(51) Int. Cl.
*E02F 3/65* (2006.01)
(52) U.S. Cl. .............................. 37/417; 37/427; 37/439; 172/817
(58) Field of Classification Search ................... 37/412, 37/417, 431, 433, 439, 416, 424–428, 442; 172/815, 817
See application file for complete search history.

(56) References Cited

U.S. PATENT DOCUMENTS

| | | | | |
|---|---|---|---|---|
| 1,807,201 A * | 5/1931 | Doran | ........................ | 37/439 |
| 1,852,200 A * | 4/1932 | Camp | ........................ | 414/421 |
| 1,952,742 A * | 3/1934 | Botsford | ..................... | 37/439 |
| 2,111,134 A * | 3/1938 | Allin | ........................... | 37/412 |
| 2,168,319 A * | 8/1939 | Brodersen et al. | ............. | 37/427 |
| 2,203,713 A * | 6/1940 | Austin | ......................... | 37/418 |
| 2,227,433 A * | 1/1941 | Berner | ........................ | 37/425 |
| 2,545,235 A * | 3/1951 | Lamy | .......................... | 37/427 |
| 2,566,901 A * | 9/1951 | McGee | ........................ | 37/428 |
| 3,154,868 A * | 11/1964 | Buchli | ......................... | 37/425 |
| 3,200,520 A * | 8/1965 | Nichoils | ...................... | 37/431 |
| 3,330,054 A * | 7/1967 | Martin | ........................ | 37/428 |
| 3,427,736 A * | 2/1969 | Martin | ........................ | 37/431 |
| 3,435,547 A * | 4/1969 | Martin | ........................ | 37/417 |
| 3,443,329 A * | 5/1969 | Martin | ........................ | 37/428 |
| 3,501,856 A * | 3/1970 | Martin | ........................ | 37/412 |
| 3,711,971 A * | 1/1973 | Martin | ........................ | 37/417 |
| 3,738,028 A * | 6/1973 | Reinhardt | ..................... | 37/416 |
| 3,866,341 A * | 2/1975 | Fabrygel | ...................... | 37/428 |
| 4,062,136 A * | 12/1977 | Steiger | ........................ | 37/426 |
| 4,336,663 A * | 6/1982 | Moberly | ....................... | 37/415 |
| 4,892,155 A | 1/1990 | Wanamaker | ................. | 172/199 |
| 5,529,131 A * | 6/1996 | Van Ornum | .................. | 172/789 |
| 5,529,155 A | 6/1996 | Jones et al. | ............. | 188/322.21 |
| 6,168,348 B1 * | 1/2001 | Meyer et al. | ................... | 404/90 |
| 6,354,383 B1 | 3/2002 | Muilenburg | ................. | 172/817 |
| 6,662,480 B1 | 12/2003 | Stevens | ........................ | 37/444 |
| 6,913,086 B2 | 7/2005 | Stevens | ....................... | 172/815 |

(Continued)

*Primary Examiner*—Thomas A Beach
(74) *Attorney, Agent, or Firm*—Nikolai & Mersereau, P.A.; Thomas J. Nikolai

(57) ABSTRACT

A scraper for plowing and gathering earth specifically adapted to fit to the front end of a skid steer vehicle. The scraper includes a frame for holding a scraper bowl. A caster wheel assembly is coupled to the front end of the scraper frame and is adapted to cause the scrapper bowl to adjust to the terrain. A hydraulic actuation assembly is arranged to lift the scraper bowl to carry its contents from a first site to a second site. A gate is coupled to the front end of the scraper bowl to capture the contents of the scraper bowl when its contents are moved from a first site to a second site. An implement quick-attach assembly is also provided for coupling the skid steer vehicle to the scraper frame in such a way that the frame can be made to pivot to vary the pressure between the earth being traversed and the cutting blade.

1 Claim, 6 Drawing Sheets

U.S. PATENT DOCUMENTS

| | | | |
|---|---|---|---|
| 7,021,398 B1 | 4/2006 | Marshall | 172/788 |
| 2003/0136568 A1 | 7/2003 | McReynolds et al. | 172/817 |
| 2004/0079541 A1 | 4/2004 | Marquardt | 172/817 |
| 2005/0263302 A1 | 12/2005 | Newnam | 172/817 |

* cited by examiner

SKID STEER SCRAPER

BACKGROUND OF THE INVENTION

I. Field of the Invention

This invention relates to an earth moving apparatus, more particularly, it relates to a carrying type box scraper assembly which is adapted to be mounted on a skid steer vehicle or the like.

II. Discussion of the Prior Art

It is well known in the prior art to use scrapers or graders to roughly level soil. These scrapers can be secured to the forward or rearward ends of a tractor, skid steer loader or the like. When mounted on a forward end of a skid steer loader, these scrapers are often mounted on the boom arms of the skid steer loader where the boom arms can be raised or lowered to raise or lower the box scraper. Therefore, it is well known to push a box scraper across a field of dirt to create a smoothed-out path. However, this raises the question of what to do with the earth that is scraped into the box. It has been found desirable to carry the earth collected in a box scraper from a first site to a second site.

Patents, such as U.S. Pat. Nos. 7,021,398 and 6,168,348, teach box scraper assemblies having a cutting blade, a back wall and two side walls. However, if dirt is captured in these box scraper assemblies, there is no way to move the dirt from a first site to a second site since whatever dirt is collected in the box scraper will merely fall out of the front or the bottom of the box.

Additionally, prior art box scraper assemblies are not adapted to pivot independently from the skid steer when transporting dirt. This reduces the performance and maneuverability of the box scraper assembly.

SUMMARY OF THE INVENTION

A carrying type box scraper assembly is provided for use with vehicles, such as a skid steer loader. The vehicle is a steerable motor vehicle having powered front and rear wheels or powered tracks and lifting or boom arms pivotally mounted on a chassis. A first aspect of the invention is a scraper frame having a front end and a rear end. A limited pivoting mounting unit is disposed on the rear end of the scraper frame assembly. The mounting unit couples the scraper frame to the boom arms of the skid steer. When the skid steer quick attachment hitch is pivoted forward, the mounting unit limited pivot flange members engage the scraper frame. This transfers a portion of the weight of the skid steer or like vehicle onto the scraper frame for increase performance while cutting.

A second aspect of the invention is a scraper bowl which is carried by the scraper frame. The scraper bowl has a front end and a rear end and a bottom surface extending from said front end to the rear end. The rear end faces the skid steer vehicle. An elongated cutting edge is laterally disposed on the bottom surface at the front end of the bowl and is oriented in a direction to cut earth when the frame is pushed in a forward direction by the skid steer vehicle. Space-apart side walls extend up from the bottom surface and extend from the first end to the rear end. A rear wall is disposed at the rear end of the bowl extending between the space-opposed side walls. As the scraper bowl is pushed forward by the skid steer loader, dirt is collected in the scraper bowl as it is raised by the cutting edge.

A third aspect of the invention is an arcuate gate member pivotally mounted on said scraper bowl. When the gate is placed in a first position, a mechanical device creates an open space between the gate and the front end of the scraper bowl enabling dirt to easily be raised by the cutting edge, filling the bowl to the rear wall and spaced-apart side walls. When the gate is in its second position it obstructs an opening space between the spaced-apart side walls at the front end of the scraper bowl. Thus, when the gate is in said second position, dirt that has been collected is captured in the bowl. The dirt can then be easily carried to a second site where the bowl may be emptied out. When the gate is in a third position a mechanical device lifts the gate providing a open space between the gate and the spaced-apart side walls and the front end of the scraper bowl dumping the dirt on the second site.

A fourth aspect of the invention is an actuation assembly for moving the scraper bowl relative to the scraper frame. The actuation assembly includes an actuation frame, two linkage arms and two hydraulic cylinders. The linkage arms have first and second ends. The first end of each of the linkage arms is pivotally coupled to the scraper frame. The second ends of the linkage arms are pivotally coupled to the bowl side wall. The actuation frame also has first and second ends. The first end is attached pivotally to the scraper frame and the second end is attached pivotally to the bowl side wall. The hydraulic cylinders are operatively coupled to the scraper frame and the actuating frame such that the hydraulic cylinders effect the movement of the actuating frame and linkage arms, thus pivoting the bowl from a first position scraping operation, to the second position carrying operation and ultimately to a third position dumping operation.

When the scraper bowl is in its carrying position, the gate covers the front opening of the scraper bowl. When the scraper bowl is carried to a second site, the actuation assembly moves the scraper bowl from the second, carrying position to a dumping position where the dirt captured in the scraper bowl can be deposited at the second site.

A fifth aspect of the invention is the provision of a caster wheel assembly coupled at the front end of the scraper frame. The caster wheel assembly includes extension arm extending from the front end of the scraper frame, a fulcrum mounted on an end point of the extension arm, a beam having a first end and a second end and caster wheel brackets coupled to the first and second end of the beam. The beam is operatively engaged by the fulcrum so that the caster wheel assemblies can adapt to the terrain that is being cut.

It is therefore a principle object of the present invention to provide an improved carrying type of scraper assembly for use with a skid steer loader that can carry dirt from a first site to a second site after the skid steer loader scraper attachment is used to level dirt.

It is still another object of the invention to provide an improved carrying type scraper assembly which can be positioned on the forward ends of boom arms of a skid steer vehicle or the like.

Still another object of the invention is to provide a carrying type scraper assembly including means for pivotally moving the assembly relative to the skid steer loader such that the assembly adapts to the terrain to be leveled.

These and other objects will be apparent to those skilled in the art from the following detailed description of the apparatus depicted in the drawings.

DETAILED DESCRIPTION OF THE INVENTION

Figure 1:
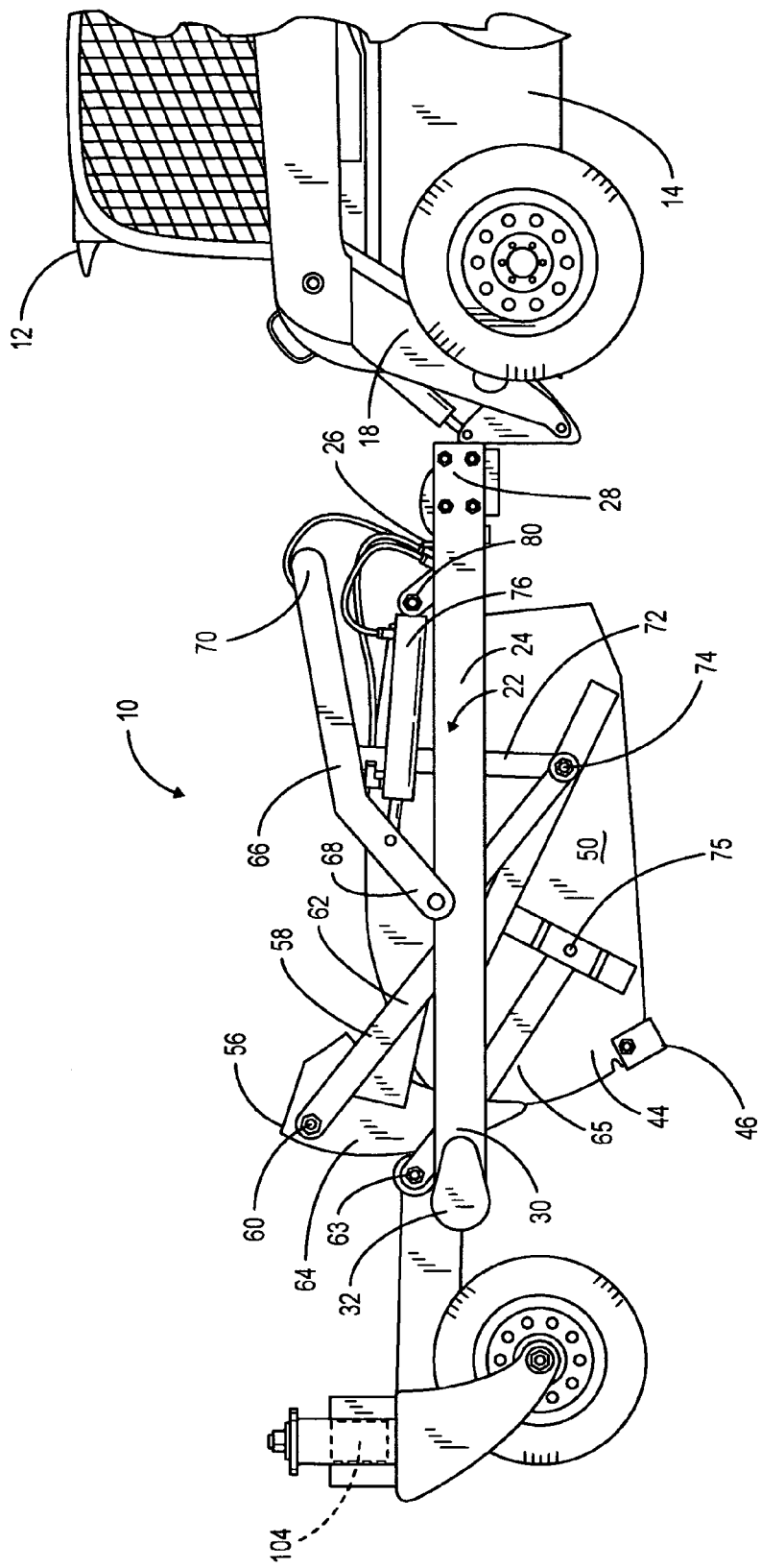
FIG. 1 is a perspective view of the skid steer scraper assembly mounted on a conventional skid steer loader vehicle with the scraper bowl in its scraping position.

In FIG. 1 the scraper assembly is generally designated by the numeral 10. The scraper assembly 10 of the present invention is for use with all types of skid steer vehicles to be used at or on construction, building, farm and landscaping sites. FIG. 1 shows a conventional skid steer loader 12 having a pair of hydraulically operated lifting arms 18 that can be raised or lowered by an operator relative to the skid steer's chassis 14.

Figure 2:
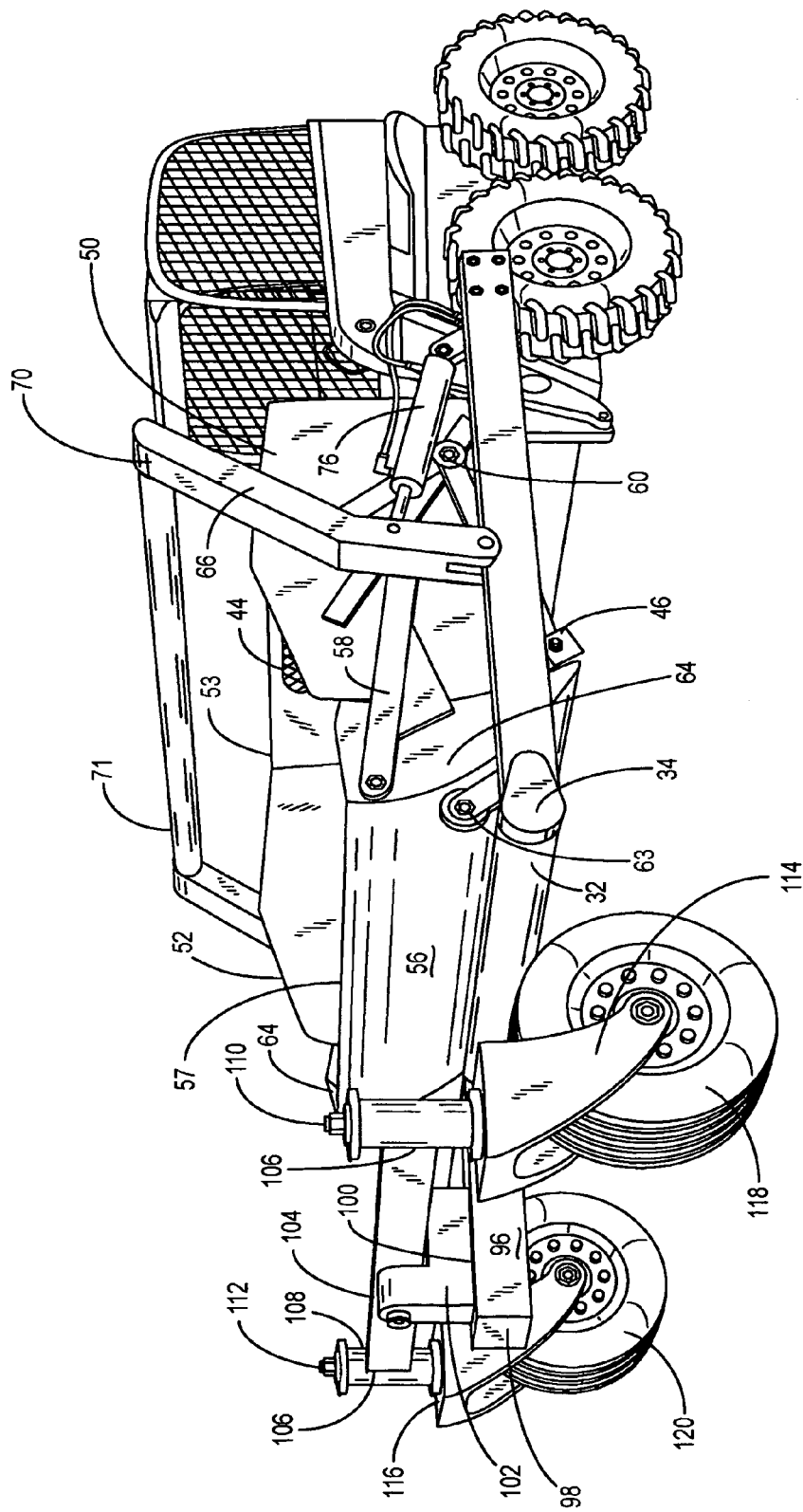
FIG. 2 is a partial front perspective view of the invention with the scraper bowl in its carrying position.

The carrying type of scraper assembly 10 first includes a scraper frame indicated generally by numeral 22. The scraper frame 22 includes longitudinally extending beams 24, 26 running parallel to one another. Each of the beams 24, 26 has a first end 28 and a second end 30. The scraper frame 22 also includes a front crossbar 32 (FIG. 2) extending between the second ends 30 of the beams 24, 26. As seen in FIG. 2, the front crossbar 32 with a first end 34 and a second end 36, wherein the first end 34 is welded to the second end 30 of beam 24 and the second end 36 of the front crossbar 32 is welded to the second end of beam 26.

Figure 3:
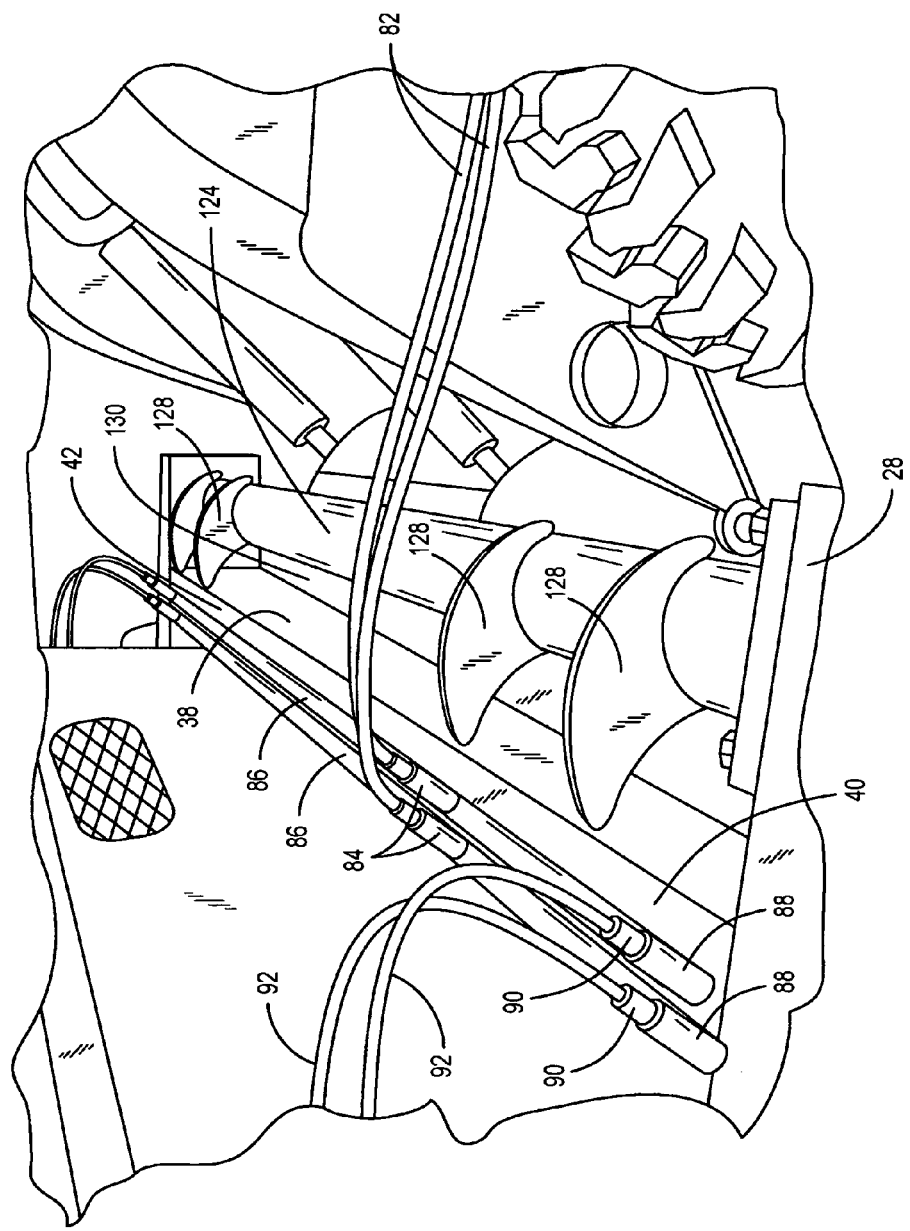
FIG. 3 is a partial rear perspective view of the invention.

As seen in FIG. 3, proximate the first (rear) end 28 of beams 24, 26 is rear crossbar 38. Rear crossbar 38 is formed from steel rectangular tubing and has a first end 40 and a second end 42. The first end 40 of rear crossbar 38 is welded proximate the first end 28 of beam 24, and the second end 42 of the rear crossbar 38 is joined to the first end of beam 26.

A scraper bowl 44 is disposed in the scraper frame 22 between the front cross bar 32 and the rear crossbar 38. The scraper bowl 44 includes a front end 46, a rear end 48 and a bottom surface 49 extending from the front end 46 to the rear end 48. Spaced-apart side walls 50, 52 (FIG. 2) extend from the front end 46 to the rear end 48 along said bottom surface 51. A rear wall 53 is disposed at the rear end 48 of the bowl extending between the space-opposed side walls 50, 52. This leaves an opening between the space-opposed side walls 50, 52 at the front end 46. An elongated cutting edge 54 laterally traverses the front end between the space-opposed side walls 50, 52 along the bottom surface 51. The cutting edge 54 is oriented in a direction to cut into the earth at a shallow angle when the scraper bowl 44 is pushed along the ground by the skid loader 12 and the earth is collected inside the scraper bowl 44.

FIG. 2 shows that a gate 56 is provided to selectively cover the opening of the front end of the scraper bowl 44. The gate 56 (FIG. 2) has a front shield area 57 extending between two gate side walls 64. The front shield 57 is generally arcuate in shape. The gate 56 is pivotally mounted on the scraper bowl 44 by a pair of pivot arms 58 on opposed sides of the scraper bowl. Each pivot arm 58 has a first end 60 and a second end 62, where the first end 60 is welded to the gate side wall 64. The second end 62 of pivot arms 58 is pivotally coupled to the space-opposed side walls 50, 52 of the scraper bowl. When the gate 56 is in a first position, it substantially obstructs or covers the opening in the front end 46 of the scraper bowl 44. When the gate 56 is in a second position, the front opening of the scraper bowl 44 is substantially unobstructed and ready to receive dirt as it is cut by the cutting edge 54 when the scraper 10 is being pushed by a skid steer vehicle. A roller 63 is mounted on the first end of the second bowl attachment arms 65 which is coupled to the front cross bar 32 facing the gate 56. As seen in FIG. 2, the roller 63 engages the front shield 57 of the gate for easy rotation of the gate 56 from the first position to the second position.

A hydraulically-powered actuation assembly is provided for controlling the position of the scraper bowl 44. The actuation assembly includes linkage arms 66 (FIG. 1) having a first end 68 and a second end 70. The first end 68 of linkage arms 66 is pivotally coupled to the beams 24, 26 of the scraper frame. A transverse connector arm 71 (FIG. 2) connects the linkage arms 66 between their second ends 70 such that the linkage arms 66 on the opposed sides of the frame 24 will move in unison.

Space-opposed first bowl attachment arms 72 each have two ends. The first end is commonly welded to the actuation assembly 66 near the first end 68. The second ends 74 are pivotally coupled to the space-opposed side walls 50, 52 of the scraper bowl 44. The second bowl attachment arms 65 have two ends, first end 73 and second end 75. The first end 73 is space-opposed and is pivotally coupled the near the first end 34 and second end 36 of the front crossbar 32 of the scraper frame 22. The second ends of bowl attachment arms 75 are space-opposed and are pivotally coupled to the bowl's sidewalls 50, 52.

When the linkage arms 66 are moved, the scraper bowl 44 is lifted by the bowl attachment arms 72, 65. However, when the scraper bowl 44 is in a cutting position, as seen in FIG. 1, the bowl attachment arms 72, 65 lean forward and are parallel with another.

The scraper bowl may be hydraulically lifted by a pair of hydraulic cylinders, only one of which is shown and is identified by numeral 76, operatively coupled to the linkage arms 66 on opposite sides of the frame. A piston rod of hydraulic cylinder 76 is pivotally coupled to the linkage arms 66 at one end and the cylinder is pivotally coupled to the scraper frame 22 at a second end by a hinge pin 80. When the piston of the hydraulic cylinder 76 pushes forward, it rotates the linkage arms 66 counterclockwise when viewed in FIG. 1, lifting the scraper bowl 44 off of the ground from a cutting position to a carrying position illustrated in FIG. 2 where the bowl may carry its contents from a first site to a second site.

The hydraulic cylinder 76 is powered by and controlled using the conventional hydraulic controls of skid steer 12. Hydraulic lines 82 (FIG. 3) supply the power necessary to operate the hydraulic cylinder 76 from the skid steer 12. The hydraulic lines 82 connect to supply nozzles 84 and fluid deflection conduits 86. The fluid deflection conduits 86 run along the rear crossbar 38 of the scraper frame 22. The conduits 86 provide fluid powering the hydraulic cylinders on each side of the assembly 10. Threaded fittings 88 are disposed on each end of each conduit 86 with input nozzles 90 connected to threaded fitting 88 and input hoses 92 running from the input nozzles 90 to output nozzles 94 of the hydraulic cylinders 76.

Figure 4:
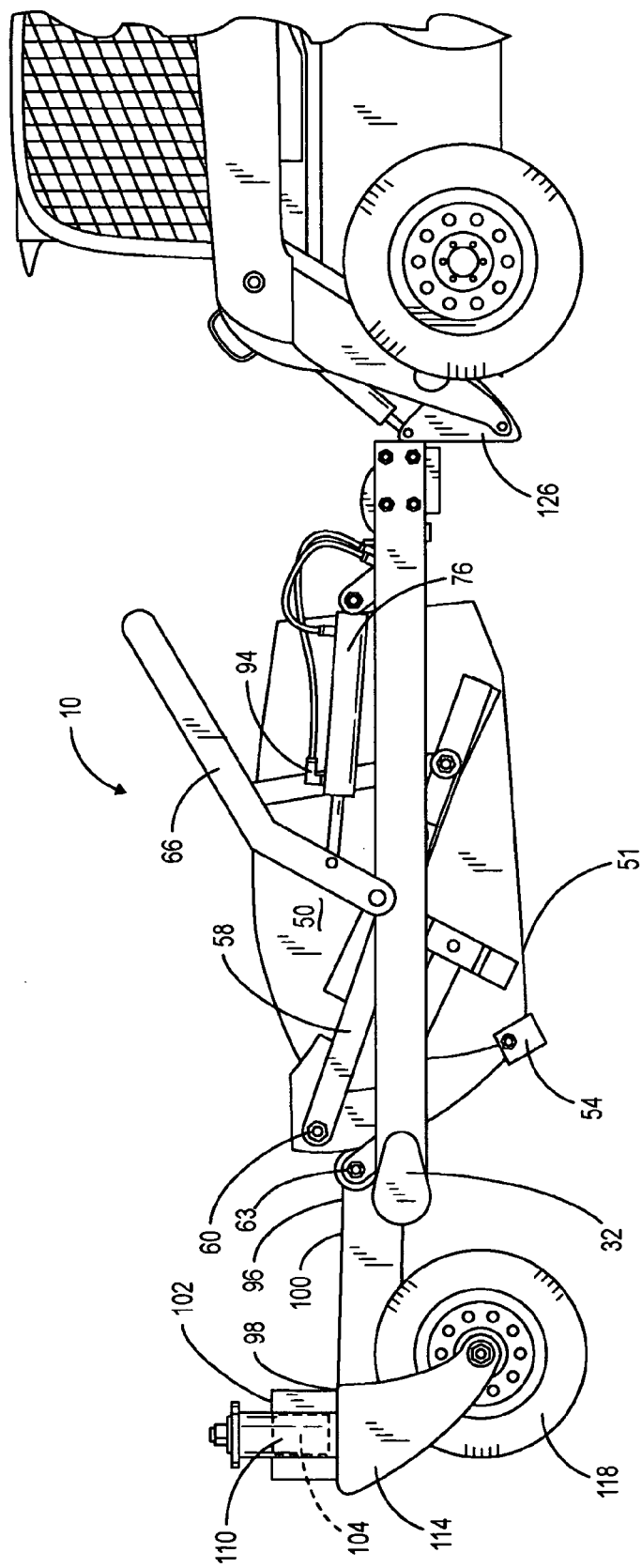
FIG. 4 is a side elevational view of the invention.
Figure 5:
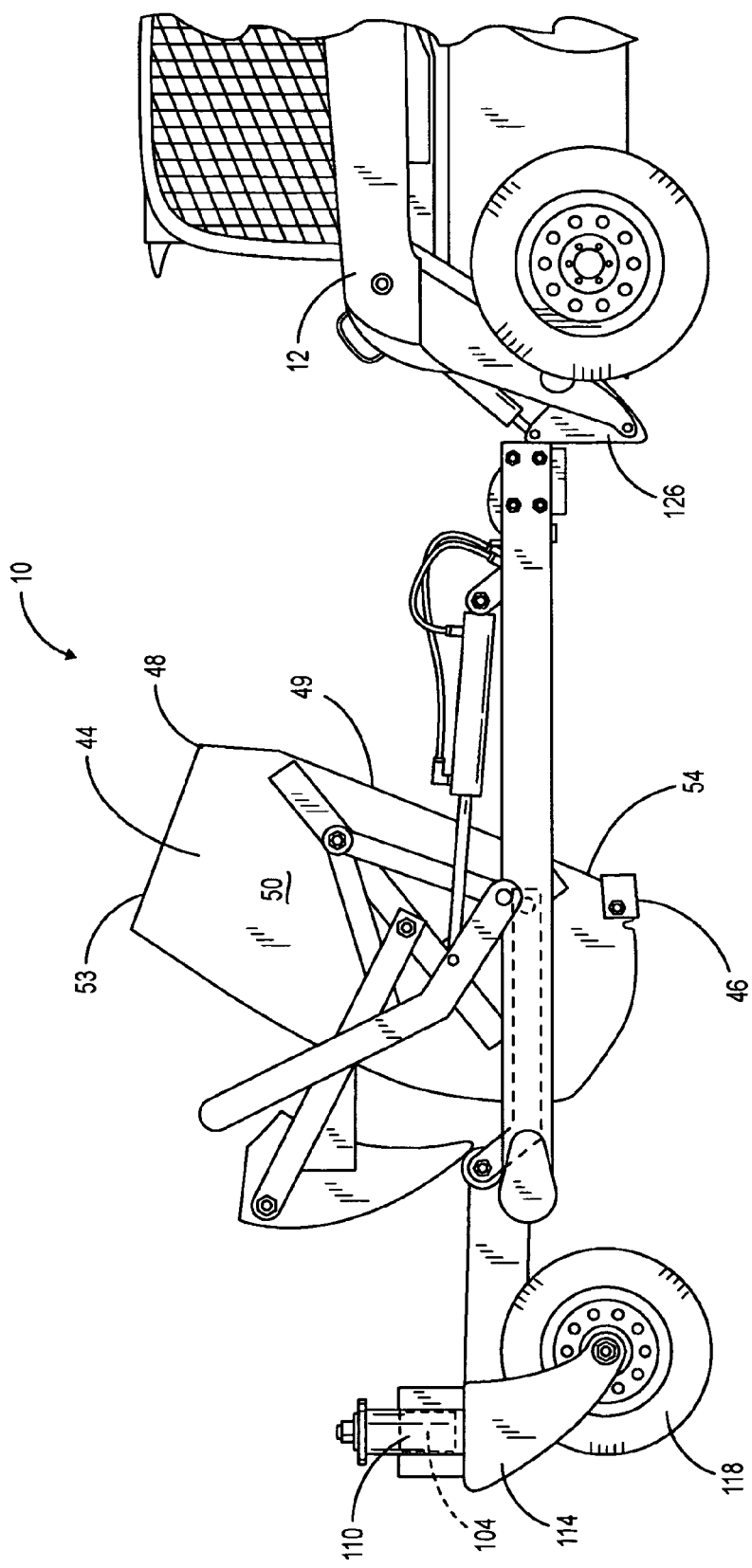
FIG. 5 is a side elevational view of the invention where the box scraper is in its dumping position.
Figure 6:
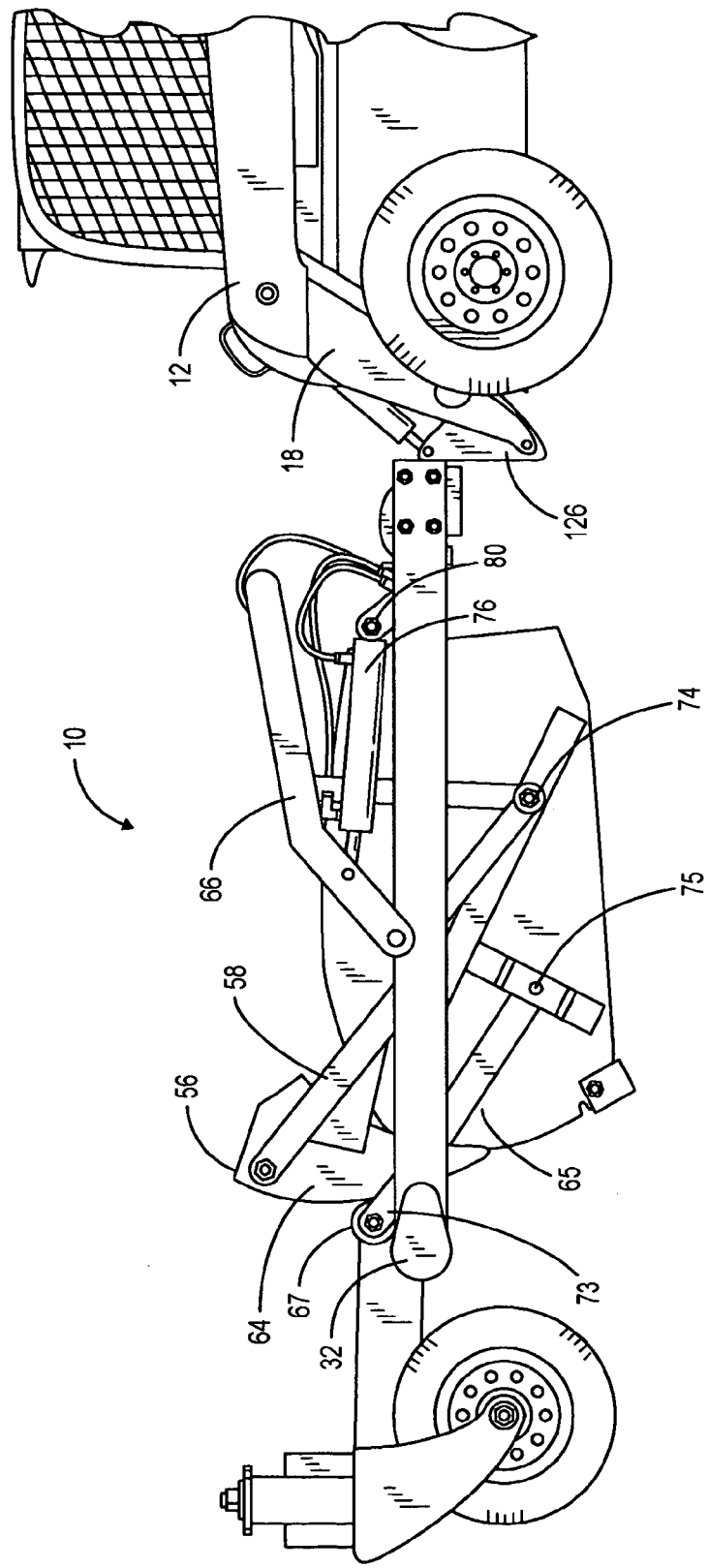
FIG. 6 is a view like that of FIG. 1.

Turning next to FIG. 4, an extension arm 96 extends in a forward direction from the front crossbar 32 of the scraper frame 22. The extension arm 96 has a top surface 100, and at forward end 98 of the extension arm 96 is a fulcrum 102. A beam 104 (FIG. 2) extends through, and is balanced on, the fulcrum 102. The beam 104 has a first end 106 and a second end 108. Kingpins 110 and 112 are disposed on each end 106, 108 of the beam 104. The kingpins 110, 112 carry a caster wheel bracket 114 adapted to hold a caster wheel 118. When the skid steer 12 pushes the assembly 10 forward, it is carried along by the caster wheel assembly described. The fulcrumbeam assembly ensures that the front end of the assembly 10 adapts to the terrain.

FIG. 3 also shows the coupling assembly for coupling the scraper frame 22 to the skid steer 12. The coupling assembly includes a rear axle 124 disposed between the first end 28 of the beams 24, 26. A forward quick attachment receptacle 126 is attached to the rear axle 124 and is modified to couple the skid steer lifting arms 18 to the rear axle 124. The quick attach receptacle 126 allows the machine to pivot independent of the skid steer while transporting. When an operator activates the scraper bowl tilting function from the skid steer's hydraulic controls, the rear axle 124 rotates counterclockwise until large ear members 128 welded to the axle engage a stopping plate 130 fastened to the rear crossbar 38. This allows more force to be applied onto the scraper bowl for deeper cut and easier loading of earth into the scraper bowl. All the functions of the scraper are controlled with one hydraulic remote circuit from the skid steer.

This invention has been defined herein in considerable detail in order to comply with the patent statutes and to provide those skilled in the art with the information needed to apply the novel principles and to construct and use such specialized components as are required. However, it is understood that the invention can be carried out by specifically different equipment and devices, and that various modifications, both as to the equipment detail and the operating procedures, can be accomplished without departing from the scope of the invention itself.

What is claimed is:

1. An improved carry-type scraper for a skid steer vehicle wherein said vehicle is a steerable motive vehicle having powered front and rear wheels or rubber tracks and hydraulically operated lifting arms pivotally mounted on a chassis, said carry-type scraper comprising:
   a) a scraper frame having a first end and a second end;
   b) a mounting unit for coupling said scraper frame to the lifting arms of the vehicle, wherein said mounting unit includes a forward quick attachment receptacle coupling the lifting arms of the vehicle to a rear axle disposed horizontally on the first end of the scraper frame, said quick attachment receptacle allowing the scraper frame to pivot independently of the skid steer while transporting;
   c) a scraper bowl carried by the scraper frame, said scraper bowl having a front end, a rear end, and a bottom surface extending from the front end to the rear end, an elongated cutting edge laterally disposed on the bottom surface at the front end of the scraper bowl and oriented in a direction to cut into the earth when said frame is pushed in a forward direction by the vehicle, the spacer bowl further having space-opposed side walls extending from the front end to the rear end along bottom surface, and a rear wall disposed at the rear end of bowl extending between the space-opposed side walls, said scraper bowl collecting earth as it is cut by the cutting edge;
   d) a gate member pivotally mounted on the scraper bowl wherein when the gate is in a first position it obstructs an opening between the space-opposed side walls at the front end of the scraper bowl so that the earth collected in the bowl is captured in the bowl, and when the gate is in a second position the opening is unobstructed;
   e) an actuation assembly for moving the scraper bowl relative to the scraper frame and concurrently moving the gate member relative to the opening of the scraper bowl, said actuation assembly having a hydraulic cylinder assembly powered by and controlled using conventional hydraulic controls of the skid steer vehicle, wherein said controls simultaneously move the scraper bowl and gate member into any one of the following modes:
      (i) a cutting position where the scraper bowl is proximate the ground and the gate member is in said second position;
      (ii) a carrying position wherein the scraper bowl is parallel to the ground and the gate member is in said first position; and
      (iii) a delivery position where the scraper bowl is tilted and the gate member is in said second position; and
   f) a caster wheel assembly coupled at the front end of the scraper frame, said caster wheel assembly including an extension arm extending from the front end of the scraper frame, a fulcrum mounted on an end point of the extension arm, a cross-beam having a first end and a second end, said beam being operatively engaged by the fulcrum, a first and second kingpin disposed at the first and second ends of the beam, and a first and second caster wheel brackets carrying caster wheels, said caster wheel brackets being coupled to the first and second kingpins wherein the caster wheel brackets trail the kingpin when the caster wheel assembly is pushed forward by the vehicle.

* * * * *